Patented July 26, 1927.

1,636,701

UNITED STATES PATENT OFFICE.

RUDOLF MEINGAST AND MARTIN MUGDAN, OF MUNICH, GERMANY, ASSIGNORS TO CONSORTIUM FUER ELEKTROCHEMISCHE INDUSTRIE, OF MUNICH, GERMANY.

PROCESS OF MANUFACTURING ACETIC ANHYDRIDE.

No Drawing. Application filed February 21, 1925, Serial No. 10,953, and in Germany February 25, 1924.

In our Patent 1,507,514 granted Jan. 19, 1926, a process of manufacturing acetic anhydride is described which consists in passing acetic acid vapor over a heated phosphate, preferably a phosphate of the aluminium group.

According to this invention sodium phosphate, particularly one having a proportion of sodium to phosphorus less than 3Na to 1P, has an effect in splitting the acetic acid at least as good as that of metal phosphates described in the above patent, and at the same time offers advantages not obtained when using other phosphates. Thus sodium phosphate is not only cheaper than other phosphates but may be recovered or purified by extraction with water when unable to continue to act as a catalyst.

It has been found, however, that sodium metaphosphate distributed on a material to which it is indifferent at a high temperature, such as graphite silicon, or silicon carbide, has an almost unlimited activity, whereas when the phosphate is distributed on a silicate it suffers in due course depreciation in activity owing to the fact that it attacks the silicate. The activity of sodium phosphate is especially good when the phosphate has been previously heated to a temperature above 700° C., for example from 800-900° C. It appears that at this high temperature salts of polymerized metaphosphoric acid are formed which are more active than the ordinary sodium phosphate.

The following examples illustrate the invention, the parts being by weight:

Example I.

45 parts of carborundum of suitable sized grain are mixed with a solution of 14,9 parts of crystallized $Na_2HPO_4,12H_2O$ and 4,9 parts of ortho-phosphoric acid of 84 per cent strength in 50 parts of water; the water is evaporated so that there is left carborundum coated with sodium phosphate, which is then heated for an hour at 900°. The catalyst thus obtained is filled in a graphite tube and acetic acid vapor is passed over it at 600-700°.

Instead of carborundum silicon can be used but it should first be treated with acid to purify it.

Potassium and lithium phosphates act similarly to sodium phosphate. By using a suitable mixture of alkali metal phosphates or of an alkali metal phosphate with another phosphate the melting point of this mixture may be below the temperature at which the scission of acetic acid occurs. In this case there is the further advantage that a liquid can be used as catalyst through which the vapor of acetic acid is conducted, with the result that the transmission of heat from the source of heat to the zone of reaction is much improved, particularly when stirring is also adopted; the output from the apparatus is thereby increased. When a liquid catalytic contact is used carbon or graphite containers have proved themselves good materials for the construction of the vessel and the stirrer. Metals or alloys may also be used, however, provided they have sufficient resistance to chemical attack. The coating of liquid alkali metal-phosphate appears to prevent injurious action of the metal in the course of the reaction.

Example II.

As catalyst there is used a mass made by mixing 102 parts of $Li_2CO_3$, 793 parts of $Na_2HPO_4$ $12H_2O$ and 405 parts of $H_3PO_4$, and heating the mixture at 850° C. Through this mass contained in a molten condition at 600-700° C. in a graphite vessel, acetic acid vapor is conducted in the form of a rapid current.

When the activity of the catalyst has diminished in consequence of separation of carbon, air may be blown through the liquid to regenerate the catalyst. It may sometimes be necessary to dissolve the catalyst and to filter the solution from the carbon before the phosphates, the composition of which may be corrected, if necessary, are used again.

What we claim is:

1. A process of manufacturing acetic anhydride which comprises passing acetic acid vapor in contact with an alkali metal phosphate heated to between 400° C. and 800° C.

2. A process of manufacturing acetic anhydride which comprises passing acetic acid vapor in contact with an alkali metal phosphate containing more than one atom of phosphorus to three atoms of alkali metal and heated to between 400° C. and 800° C.

3. A process of manufacturing acetic anhydride which comprises passing heated vapors of acetic acid in contact with a molten alkali metal phosphate.

4. A process of manufacturing acetic anhydride which comprises passing acetic acid vapor at a temperature of 600° C. to 800° C. in contact with a melt containing an alkali metal phosphate.

5. A process of manufacturing acetic anhydride which comprises passing acetic acid vapor at a temperature of 600° C. to 800° C. in contact with a melted mixture of alkali metal phosphates.

6. A process of manufacturing acetic anhydride which comprises passing acetic acid vapor at a temperature of 600° C. to 800° C. in contact with a melted mixture of alkali metal metaphosphates.

7. A process of manufacturing acetic anhydride which comprises passing acetic acid vapor at a temperature of 600° C. to 800° C. in contact with a melted mixture of alkali metal phosphates in a graphite vessel.

RUDOLF MEINGAST.
MARTIN MUGDAN.